Aug. 13, 1935.  H. O. LINDGREN  2,011,180

PROCESS OF MANUFACTURING ELASTIC COLLARS ENCLOSING ROTATING SHAFTS

Original Filed Jan. 12, 1933

WITNESS:
Rob^t R. Kitchel

INVENTOR
Hans Olof Lindgren
BY
Busser and Harding
ATTORNEYS.

Patented Aug. 13, 1935

2,011,180

UNITED STATES PATENT OFFICE 2,011,180

PROCESS OF MANUFACTURING ELASTIC COLLARS ENCLOSING ROTATING SHAFTS

Hans Olof Lindgren, Appelviken, Sweden, assignor to The De Laval Separator Company, New York, N. Y., a corporation of New Jersey Original application January 12, 1933, Serial No. 651,324. Divided and this application November 20, 1933, Serial No. 698,779. In Sweden January 30, 1932

4 Claims. (Cl. 154—2)

My invention relates to packing boxes and particularly to the elastic collars employed therein as tightening means.

In an application filed by me September 18, 1931, Ser. No. 563,539, there is disclosed a centrifugal bowl and a hollow shaft communicating with the interior of the bowl for discharge of separated liquid therefrom. An elastic collar surrounds the hollow shaft. Means, spaced from the hollow shaft, form an enclosing chamber having fluid communication with the hollow shaft and with a stationary outlet pipe and secure one end of the elastic collar in fixed position. The elastic collar is pressed against the shaft by the pressure of the liquid in the chamber.

Such a collar must not only be sufficiently elastic, but must fit very well to the shaft and effect a completely tight joint at a small liquid pressure. Since it is applied to rapidly revolving shafts which sometimes may vibrate strongly, it is also necessary that the tightening portion of the collar shall follow the shaft in its movements without too great forces being transmitted from the shaft to the collar. When the centrifuge is used for the separation of milk, the collar must be made of a material that can be easily cleaned and that will not impart any odor or taste to the products which come into contact with it. It is also desirable that the material shall have a low coefficient of friction and that it shall not quickly wear or cause a strong wear of the shaft rotating inside the collar. A low coefficient of friction is particularly important owing to the high speed of rotation. These last-mentioned qualities have a special importance for the starting of the centrifugal bowl, especially if, at that time, no provision is made for flowing liquid through the system. If a material with high coefficient of friction be used, the rise of temperature at the contact surface may, during this period, become so high, owing to poor heat conduction, that the material of the packing will be destroyed.

We have found that rubber satisfies most of the above conditions. It is elastic, can easily be cleaned, and, as long as the temperature is kept within normal limits, no odor or taste is imparted to the milk. It has been found objectionable, however, to allow the rubber to come into direct contact with the rotating shaft. If the liquid could be allowed to pass between the collar and the shaft, no objectionable phenomena would of course occur. With the collars used for the present purpose a complete tightening is, however, required. If the rubber and the shaft are in direct contact and no layer of liquid exists between them, a strong rise of temperature takes place, so that the rubber is softened and sticks to the shaft in about the same manner as a bronze alloy on a steel shaft, which may cause both the shaft and the collar to be damaged. Products having a strong taste or odor may also be transferred to the milk.

In an application filed by me January 12, 1933, Serial No. 651,324, of which this application is a division, I describe and claim an improved collar, the greater part of which is made of rubber and which is provided with an inner lining, preferably of asbestos preferably reinforced and preferably impregnated with a lubricant, and which affords a tightening means between the rotating shaft and the enclosing fluid conducting chamber. It is advantageous to place the lining in the collar during vulcanization, thereby insuring their permanent attachment. It is, however, important to prevent the rubber mass from penetrating through the whole lining during vulcanization. Such a collar would have most of the defects of an unlined rubber collar. Since most organic lubricants attack rubber, it is important, in case the lining is impregnated with such a lubricant, to avoid the diffusion of the lubricant to the rubber.

The object of the present invention is to provide a process for the manufacture of elastic collars provided with a permanently secured inner lining, whether the lining be of asbestos or other material, whether or not it is reinforced or impregnated with a lubricant, and whether it is made of single ply material or of multiple layers.

It will aid in the description of the process to describe the several different constructions of elastic collars that are disclosed in the application of which the present application is a division. In the drawing.

Figure 1:
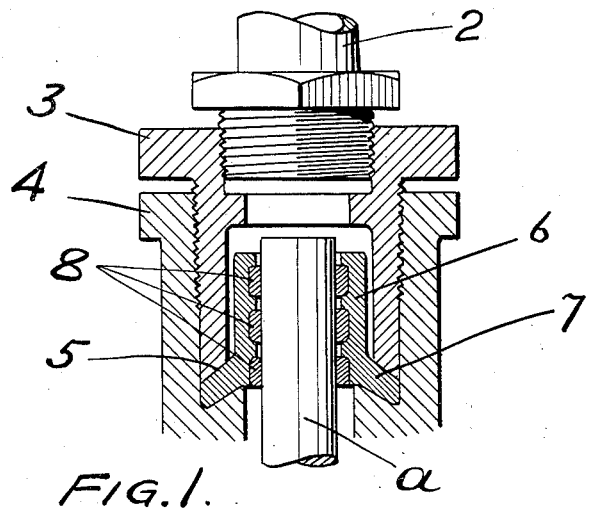
Fig. 1 is a sectional elevation of a packing box including the composite collar made in accordance with my improved process.

In Figure 1, $a$ represents a hollow shaft, rotating with a centrifugal separating bowl (not shown), through which flows the mixture to be separated, or the liquid to be purified, or the purified liquid, or one of the separated liquids. Through a stationary packing box the hollow shaft communicates with an inlet or outlet pipe 2. The packing box comprises a chamber formed of two annular members, one (4) threaded upon the other (3), enclosing the rubber collar 5, which consists of a cylindrical or tube-shaped portion 6 having an annular foot or flange 7 confined between the lower edge of the member 3 and an internal annular flange at the bottom of the member 4. The lining shown comprises three spaced apart sections 8.

Figure 2:
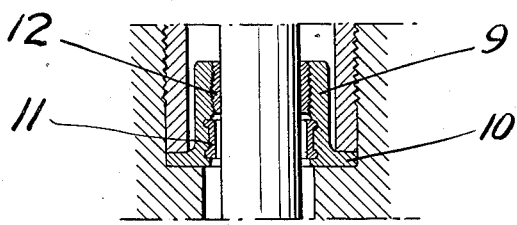
Figs. 2 and 3 are sectional elevations of modified forms of said composite collar.

Fig. 2 illustrates a modification which has been found particularly efficient for making a tight joint against high pressures. The collar 9 with its foot or flange 10 must be efficiently pressed against a seat in the stationary chamber. In operation the foot of the collar is sometimes deformed in such manner that a high contact pressure between the collar and the shaft is created before admission of the liquid. This is avoided by providing a ring 11 of metal in the tube shaped portion within or adjacent the end thereof provided with the foot. The ring reduces the compression of the collar. The remaining part of the collar is provided with a lining 12. If desired the ring may be applied to the rubber mass before vulcanization.

Figure 3:
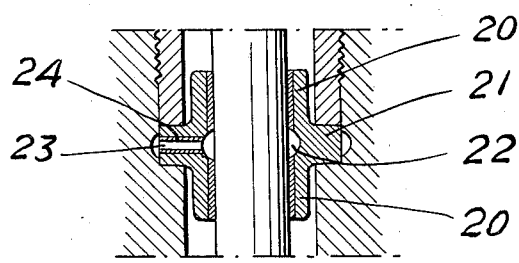

Fig. 3 illustrates a modification which is suitable for use when a tightening device is arranged between chambers through which flow two different liquids, as, for example, separated milk and cream, as in my application filed September 18, 1931, Ser. No. 563,540. This application discloses two collars with opposing feet spaced apart to form a chamber which may be put into communication with the atmosphere, so that any liquid which leaks past either of the collars will escape through the chamber. Instead of using two separate collars I have found it practicable to employ a single collar comprising end tubular portions 20 having an intermediate circumferential flange 21. If it is desired to make provision for the escape of leakage liquid, the collar may have formed within its flanged intermediate portion an annular collection chamber 22, with channels 23 in the flange for the discharge of such liquid. In order to avoid deformation of the collar when it is fixed in position (which might clog the discharge channels), the channels should be lined with metal tubes 24, which are preferably placed in the collar before vulcanization.

In all of the above described constructions there is included a composite collar comprising an outer rubber tubular member and an inner lining permanently secured thereto and which is adapted to afford a tightening means between a rotating shaft and an enclosing fluid conducting chamber. In manufacturing the composite collar, I may, in accordance with one procedure, impregnate the inner zone of the lining, that is, the zone which adjoins the rubber, with a substance that solidifies and forms a wall through which the rubber cannot penetrate. Such substance may be afterward removed by means of a suitable dissolving means. I have found that shellac and certain cellulose lacs may be used for this purpose. In some cases it is practicable wholly to impregnate the lining with a material of this kind and then to dissolve the impregnating material in the outer layer of the lining so that a zone is formed beyond which the rubber cannot penetrate during the vulcanization. This process is suitable when the pores of the lining can absorb a large proportion of the impregnating means. The dissolving means must of course not attack the rubber. This process may be used to advantage for collars whose lining cannot be impregnated with a lubricant, as one can never be sure that a layer is formed which isolates the lubricant from the rubber. After the lining is secured to the rubber during vulcanization, the impregnating material may be removed from the outer zone of the lining. In other cases it is suitable to produce between the lining and the rubber a thin metallic layer to which the rubber is fixed by the vulcanization. For example, a thin metal layer may be precipitated on the outside of the carefully graphite-coated lining, nickel and iron being the most suitable metals. The whole of the lining may be impregnated with graphite before the precipitation of the metal. This method is particularly suitable for collars whose lining consists of a tube pressed of metal, asbestos and graphite. The layer separating the lining and the rubber may also consist of a sleeve embracing the lining and pressed of very thin metal.

In the foregoing variations of the process it has been assumed that the lining consists of only one part, but this is not necessary, as in some cases it may be more suitable to provide the collar with two or more spaced apart annular linings. Between the linings and the collar and the shaft, small chambers are thus formed which are filled with air or liquid.

What I claim and desire to protect by Letters Patent is:

1. A process for manufacturing a composite collar comprising an outer rubber tubular member and an inner lining and which is adapted to afford a tightening means between a rotating shaft and an enclosing fluid conducting chamber, said process comprising impregnating the inner zone of the lining with a material adapted to solidify and form a wall resistive to the penetration of rubber, and securing the lining to the rubber member during vulcanization, whereby the rubber is prevented from penetrating to the inner surface of the lining.

2. A process for manufacturing a composite collar comprising an outer rubber tubular member and an inner lining and which is adapted to afford a tightening means between a rotating shaft and an enclosing fluid conducting chamber, said process comprising impregnating the inner zone of the lining with a dissoluble material resistive to the penetration of rubber, securing the lining to the rubber member during vulcanization, whereby the rubber is prevented from penetrating to the inner surface of the lining, and then removing said material by dissolving it.

3. A process for manufacturing a composite collar comprising an outer rubber tubular member and an inner lining and which is adapted to afford a tightening means between a rotating shaft and an enclosing fluid conducting chamber, said process comprising completely impregnating the lining with a dissoluble material resistive to the penetration of rubber, removing the impregnating material from the outer zone of the lining, and securing the lining to the rubber member during vulcanization.

4. A process for manufacturing a composite collar comprising an outer rubber tubular member and an inner lining and which is adapted to afford a tightening means between a rotating shaft and an enclosing fluid conducting chamber, said process comprising completely impregnating the lining with a dissoluble material resistive to the penetration of rubber, removing the impregnating material from the outer zone of the lining, securing the lining to the rubber member during vulcanization, and then removing the impregnating material from the inner zone of the lining.

HANS OLOF LINDGREN.